(12) United States Patent
Stanwood et al.

(10) Patent No.: US 9,326,183 B2
(45) Date of Patent: Apr. 26, 2016

(54) UPLINK INTERFERENCE RESOLUTION IN A WIRELESS COMMUNICATION SYSTEM

(71) Applicant: CYGNUS BROADBAND, INC., San Diego, CA (US)

(72) Inventors: Kenneth L. Stanwood, Vista, CA (US); David Gell, San Diego, CA (US); Murat Karsi, San Diego, CA (US)

(73) Assignee: Wi-LAN Labs, Inc., San Diego, CA (US)

( * ) Notice: Subject to any disclaimer, the term of this patent is extended or adjusted under 35 U.S.C. 154(b) by 71 days.

(21) Appl. No.: 14/206,853

(22) Filed: Mar. 12, 2014

(65) Prior Publication Data

US 2014/0274096 A1 Sep. 18, 2014

Related U.S. Application Data

(60) Provisional application No. 61/798,572, filed on Mar. 15, 2013.

(51) Int. Cl.
*H04W 72/00* (2009.01)
*H04W 28/02* (2009.01)
(Continued)

(52) U.S. Cl.
CPC ....... *H04W 28/0236* (2013.01); *H04J 11/0056* (2013.01); *H04W 72/0426* (2013.01); *H04W 72/082* (2013.01); *H04W 84/045* (2013.01)

(58) Field of Classification Search
CPC ... H04W 72/082; H04W 16/10; H04W 24/10; H04W 52/243; H04W 24/08; H04W 92/20; H04W 36/22; H04W 72/005; H04W 72/0406; H04W 88/04; H04W 36/0083; H04W 52/241; H04W 72/085; H04W 16/14; H04W 24/00
USPC ............ 455/422.1, 450–455, 464, 509, 63.1, 455/114.2, 278.1; 370/328–337, 339, 370/341–348, 431–463
See application file for complete search history.

(56) References Cited

U.S. PATENT DOCUMENTS 8,204,442 B2   6/2012   Sankar et al.
9,137,688 B2   9/2015   Karsi
(Continued)

FOREIGN PATENT DOCUMENTS

EP    2750475 A1    7/2014
WO    2011/088465 A1    7/2011
(Continued)

OTHER PUBLICATIONS

Brück. "3G/4G Mobile Communications Systems." Qualcomm Corporate R&D Center Germany. Mar. 5, 2012, 19 pages.
(Continued)

*Primary Examiner* — Ronald Eisner
(74) *Attorney, Agent, or Firm* — Procopio, Cory, Hargreaves & Savitch LLP

(57) ABSTRACT

An access node is provided in a wireless communication network for conducting interference resolution of a received signal, the access node comprising a transceiver module, a backhaul module, and a memory. The access node further comprises a processor coupled to the transceiver module, the backhaul module and the memory and configured to identify a neighboring access node in the wireless communication network, to exchange, via the backhaul module, communication parameters with the neighboring access node, to receive, via the transceiver module, a signal comprising a transmission from a first user equipment and an interfering transmission from a second user equipment, the signal being received over a plurality of uplink resources, to receive, via the backhaul module, resource information from the neighboring access node, the resource information corresponding to the plurality of uplink resources, and to apply the resource information for interference resolution of the received signal.

23 Claims, 12 Drawing Sheets

(51) Int. Cl.

| | |
|---|---|
| *H04J 11/00* | (2006.01) |
| *H04W 72/08* | (2009.01) |
| *H04W 72/04* | (2009.01) |
| *H04W 84/04* | (2009.01) |

(56) References Cited

U.S. PATENT DOCUMENTS

| | | | |
|---|---|---|---|
| 2008/0051087 A1* | 2/2008 | Ryu | H04W 36/12 455/436 |
| 2008/0117833 A1* | 5/2008 | Borran | H04W 72/082 370/252 |
| 2010/0087221 A1 | 4/2010 | Srinivasan et al. | |
| 2011/0065447 A1 | 3/2011 | Hahm et al. | |
| 2011/0124289 A1* | 5/2011 | Balachandran | H04J 11/0053 455/63.1 |
| 2011/0201341 A1 | 8/2011 | Choudhury et al. | |
| 2014/0286269 A1 | 9/2014 | Stanwood et al. | |
| 2014/0286270 A1 | 9/2014 | Karsi et al. | |
| 2015/0280888 A1 | 10/2015 | Karsi et al. | |

FOREIGN PATENT DOCUMENTS

| | | |
|---|---|---|
| WO | 2011/159042 A2 | 12/2011 |
| WO | 2012/139624 A1 | 10/2012 |
| WO | 2013/029413 A1 | 3/2013 |
| WO | 2013/069627 A1 | 5/2013 |

OTHER PUBLICATIONS

Pauli et al. "Heterogeneous LTE Networks and Inter-Cell Interference Coordination." Novel Mobile Radio Research. Dec. 2010, 9 pages.
Pauli et al. "Inter-Cell Interference Coordination for LTE-A." Novel Mobile Radio Research. Sep. 2011, 7 pages.
Jia-Ming et al. "A New Channel Estimation Model in OFDM System Based on Improved Pilot Training Sequence." 2004 4th International Conference on Microwave and Millimeter Wave Technology Proceedings. pp. 846-849.
"Exploring the World of Wireless LTE-Advanced and Coordinated Multi-Point (COMP): What Goes Around, Comes Around. Special Preview Edition." Signals Ahead. 8(5):Apr. 16, 2012.
Rayal. "An overview of the LTE physical layer." EE Times. May 24, 2010. Downloaded from the following sites on Jul. 29, 2014: http://www.eetimes.com/document.asp?doc_id=1278096; http://www.eetimes.com/document.asp?doc_id=1278137; http://www.eetimes.com/document.asp?doc_id=1278199.
Du et al. "Channel Estimation for D-Blast OFDM Systems." School of Electrical and Computer Engineering, Georgia Institute of Technology, Atlanta, GA. Nov. 2002, 5 pages.
Ozdemir et al. "Channel Estimation for Wireless OFDM Systems." IEEE Communications Surveys & Tutorials. 9(2):18-48 (2nd Quarter 2007).
Li et al. "Channel Estimation for OFDM Systems with Transmitter Diversity in Mobile Wireless Channels." IEEE Journal on Selected Areas in Communications. 17(3):461-471 (Mar. 1999).
Sawahashi et al. "Coordinated Multipoint Transmission/Reception Techniques for LTE-Advanced." IEEE Wireless Communications, Jun. 2010 (pp. 26-34).
Lee et al. "Coordinated Multipoint Transmission and Reception in LTE-Advanced: Deployment Scenarios and Operational Challenges." IEEE Communications Magazine, Feb. 2012 (pp. 148-155).
Lee et al. "Coordinated Multipoint Transmission and Reception in LTE-Advanced Systems." IEEE Communications Magazine, Nov. 2012 (pp. 44-50).
Boudreau et al. "Interference Coordination and Cancellation for 4G Networks." LTE Part II: 3GPP Release 8. IEEE Communications Magazine, Apr. 2009 (pp. 74-81).
Léost et al. "Interference Rejection Combining in LTE Networks." Bell Labs Technical Journal. 17(1):25-50 (2012).
Wild et al. "Joint Channel Estimation across Multiple Cells in Coordinated Multi-Point." IEEE 2012, pp. 845-849.
Kottkamp et al. "LTE-Advanced Technology Introduction White Paper." Rohde & Schwarz. Aug. 2012, 41 pages.
Roessler et al. "LTE-Advanced (3GPP Rel.11) Technology Introduction White Paper." Rohde & Schwarz. Jul. 2013, 39 pages.
Taoka et al. "MIMO and CoMP in LTE-Advanced." NTT DOCOMO Technical Journal. 12(2):20-28, Sep. 2010.
Panasonic. "Uplink enhancement for Rel.11." 3GPP TSG-RAN WG1 Meeting #66, R1-112367. Athens, Greece, Aug. 22-26, 2011. 4 pages.
Nokia. "DL CoMP phase2 simulation results." 3GPP TSG-RAN WG1 Meeting #66, R1-112384. Athens, Greece, Aug. 22-26, 2011. 5 pages.
Nokia. "On cell-edge enhancements via inter-cell orthogonal DM RS." 3GPP TSG-RAN WG1 Meeting #66, R1-112394, Athens, Greece, Aug. 22-26, 2011. 3 pages.
Samsung. "UL DMRS Enhancements in Rel.11." 3GPP TSG RAN WG1 #66, R1-112520, Athens, Greece, Aug. 22-26, 2011. 3 pages.
Li et al. "Simplified Channel Estimation for OFDM Systems With Multiple Transmit Antennas." IEEE Transactions on Wireless Communications. 1(1):67-75 (Jan. 2002).
Baker. "From Macro to Small Cells: Enhancements for Small Cells in 3GPP." Alcatel-Lucent. Small Cells Summit 2013, London, UK, 12 pages.
Määttanen et al. "System-level performance of LTE-Advanced with joint transmission and dynamic point selection schemes." EURASIP Journal on Advances in Signal Processing 2012, 2012:247 (37 pages).
Hou et al. "Unified View of Channel Estimation in MIMO-OFDM Systems." IEEE 2005, pp. 34-38.
International Search Report and Written opinion for related PCT/US2014/024150, mailed Jun. 12, 2014, in 17 pages.
International Search Report and Written Opinion for PCT/US2014/041411, mailed on Sep. 23, 2014, in 10 pages.

\* cited by examiner

UPLINK INTERFERENCE RESOLUTION IN A WIRELESS COMMUNICATION SYSTEM

CROSS-REFERENCE TO RELATED APPLICATIONS

This application claims the benefit of U.S. Provisional Application No. 61/798,572, filed on Mar. 15, 2013, and entitled "Uplink Interference Resolution," which is fully incorporated by reference herein.

FIELD OF THE INVENTION

The present invention generally relates to the field of interference resolution in wireless communication systems, and specifically to the resolution of uplink (UL) interference in wireless communication systems.

BACKGROUND

Uplink (UL) interference can cause problems for a base station that is attempting to receive and process a transmitted uplink signal from a user equipment in a wireless communication system. Throughout this document the term "station", such as used in base station, macro station, macro base station, femto base station, and femto station, is intended to denote the communications equipment. The term "cell", such as used in femtocell or macrocell, is intended to denote the coverage footprint of a corresponding station or the coverage footprint of a sector of a multi-sector base station.

Broadband wireless cells may be UL interference limited. There are many scenarios that can cause UL interference. The most common scenario has historically been cell edge interference in a frequency "reuse one" network or when neighboring cells share a frequency channel, causing co-channel interference. This interference scenario is well known in the art.

However, the Long Term Evolution (LTE) wireless communication standard adds an additional very important scenario. When a femto base station is present in the macrocell coverage footprint of a macro base station in a frequency "reuse one" network, this can create what is termed in LTE as "the near-far problem." If a user equipment (UE) is in the femtocell coverage area of the femto base station, but is in communication with the more distant macro base station, it may be transmitting using a very high power thereby causing excessive uplink interference at the femto base station. Other uplink interference scenarios exist as would be known to one skilled in the art.

Aside from brute force methods, such as using very robust and inefficient modulation and coding schemes, current methods to combat this problem include coordinated multi-point (CoMP) which contains multiple methods. First, fractional frequency reuse may be used, coordinating the UL resources so that a UE communication with a macrocell and a UE communication with a femto base station that has an overlapping coverage footprint do not transmit on the same subcarriers simultaneously. This technique has been previously used in WiMAX. Second, the two base stations may use beamforming to coordinate the UL resources spatially. Both of these methods require coordinated scheduling. Additionally, using joint reception, both base stations may receive the same data from an individual UE using the same subcarriers at the same time. This method may additionally use beamforming. The joint reception, of course, uses double the resources because the resources of both base stations are tied up with the same reception.

Fractional frequency reuse is inefficient due to the need for one base station to not schedule UL resources while the other is using them. Beamforming requires significant antenna resources which may not be available on a femto base station. Additionally, there may be times when coordinated scheduling of beamforming cannot be achieved due to the bandwidth and QoS/QoE needs of interfering UEs, requiring a fallback to fractional frequency reuse.

There exists a need for a spectrally efficient (e.g., efficient modulation and coding, transmitting using all available time and frequency resources) method to resolve UL interference as an alternative to existing spectrally inefficient solutions which merely mitigate UL interference.

SUMMARY

Systems, devices and methods for conducting interference resolution in a communication system are provided.

In an aspect, an access node is provided in a wireless communication network for conducting interference resolution of a received signal, the access node comprising a transceiver module, a backhaul module, and a memory. The access node further comprises a processor coupled to the transceiver module, the backhaul module and the memory and configured to identify a neighboring access node in the wireless communication network, to exchange, via the backhaul module, communication parameters with the neighboring access node, to receive, via the transceiver module, a signal comprising a transmission from a first user equipment and an interfering transmission from a second user equipment, the signal being received over a plurality of uplink resources, to receive, via the backhaul module, resource information from the neighboring access node, the resource information corresponding to the plurality of uplink resources, and to apply the resource information for interference resolution of the received signal.

In another aspect, an access node is provided in a wireless communication network for providing interference resolution assistance to a neighboring access node. The access node comprises a transceiver module configured to receive and send data via the wireless communication network, a backhaul module configured to receive and send data via a backhaul communication link and a memory. The access node further comprises a processor coupled to the transceiver module, the backhaul module and the memory and configured to exchange, via the backhaul module, communication parameters with the neighboring access node, to receive, via the transceiver module, a signal comprising a transmission from a first user equipment and an interfering transmission from a second user equipment, to receive, via the backhaul module, an assistance request from the neighboring access node, the assistance request including an identification of a plurality of uplink resources, and to send, via the backhaul module and in response to the assistance request, resource information to the neighboring access node, the resource information being associated with the received signal in the identified plurality of uplink resources.

In a further aspect, a method is provided for interference resolution of a received signal in a wireless communication network that includes an access node and a neighboring access node. The method comprises the steps of identifying, at the access node, a neighboring access node in the wireless communication network, receiving at the access node, via the wireless communication network, a first signal comprising a transmission from a first user equipment and interference associated with a transmission from a second user equipment, the first signal being received over a plurality of uplink resources, and receiving at the neighboring access node, via the wireless communication network, a second signal comprising the transmission from the second user equipment and interference associated with the transmission from the first user equipment. The method further includes the steps of sending from the neighboring access node, via the backhaul communication link, resource information to the access node, the resource information being associated with the received second signal over the plurality of uplink resources, receiving at the access node, via the backhaul communication link, the resource information from the neighboring access node, and conducting, at the access node, interference resolution of the received first signal using the resource information received from the neighboring access node.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Systems, devices and methods for conducting interference resolution in a communication system are provided.

The systems and methods disclosed herein can be applied to various types of wireless communication systems, as well as wired communication systems. For example, the systems and methods disclosed herein can be used with Cellular 2G, 3G, 4G (including Long Term Evolution (LTE), LTE Advanced, and WiMAX), 5G, cellular backhaul, Wi-Fi, Ultra Mobile Broadband (UMB), and other point-to-point or point-to-multipoint wireless technologies. The systems and methods disclosed herein may also be implemented in wired communication systems including, but not limited to, hybrid fiber-coax cable modem systems. For concise exposition, the descriptions provided herein use terminology and aspects of particular communication technologies and standards; however, the devices, systems and methods described herein are broadly applicable to other communication technologies and standards as well.

Figure 1A:
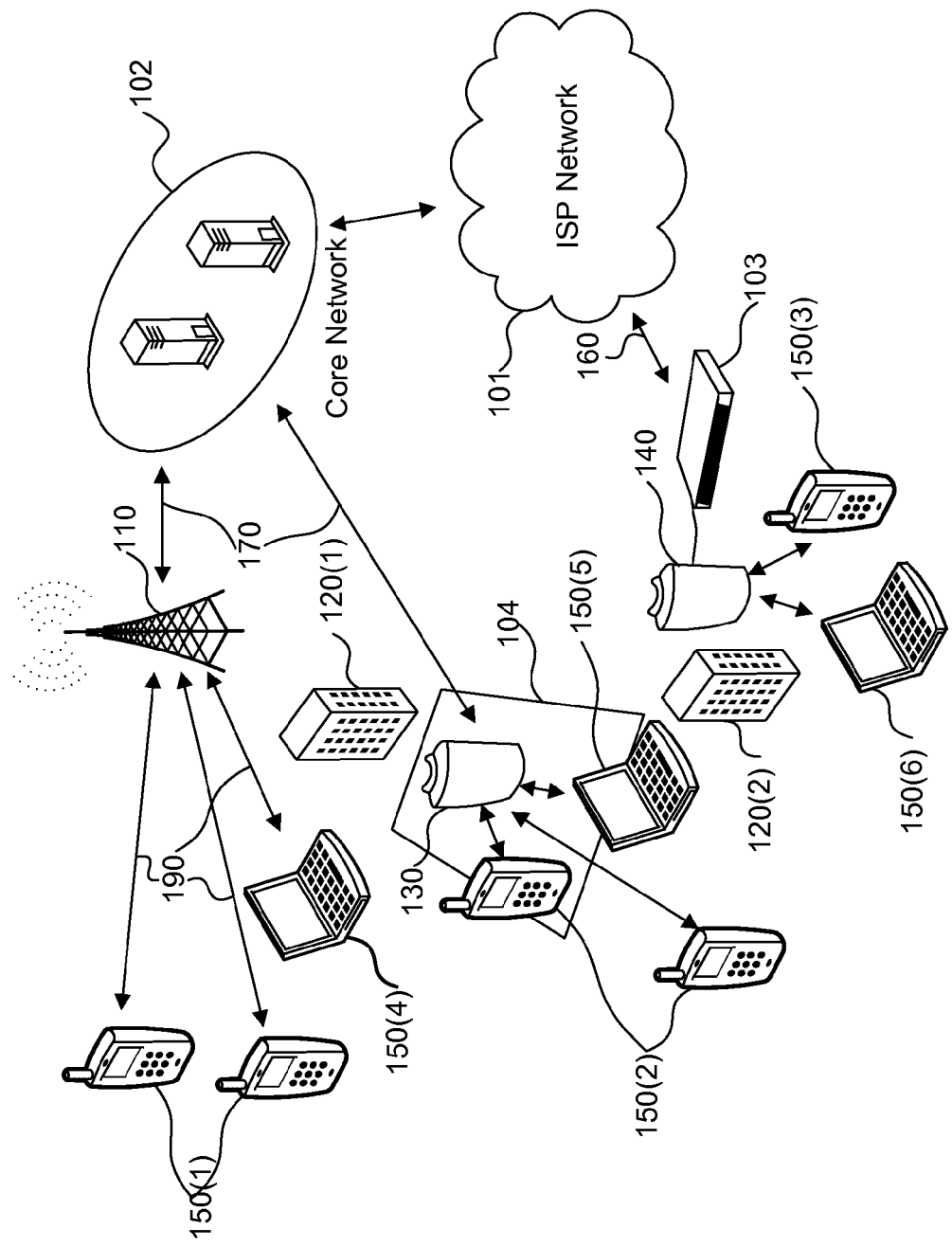
FIG. 1A is a block diagram of a communication network in which systems and methods disclosed herein may be implemented in accordance with aspects of the invention.

FIG. 1A is a block diagram of a communication network in which systems and methods disclosed herein may be implemented in accordance with aspects of the invention. A macro base station 110 is connected to a core network 102 through a backhaul connection 170. In an embodiment, the backhaul connection 170 is a bidirectional link or two unidirectional links. The direction from the core network 102 to the macro base station 110 is referred to as the downstream or downlink (DL) direction. The direction from the macro base station 110 to the core network 102 is referred to as the upstream or uplink (UL) direction. Subscriber stations 150(1) and 150(4) can connect to the core network 102 through the macro base station 110. Wireless links 190 between subscriber stations 150 and the macro base station 110 are bidirectional point-to-multipoint links, in an embodiment. The direction of the wireless links 190 from the macro base station 110 to the subscriber stations 150 is referred to as the downlink or downstream direction. The direction of the wireless links 190 from the subscriber stations 150 to the macro base station 110 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 150 access content over the wireless links 190 using base stations, such as the macro base station 110, as a bridge.

In the network configuration illustrated in FIG. 1A, an office building 120(1) causes a coverage shadow 104. A pico station 130 can provide coverage to subscriber stations 150(2) and 150(5) in the coverage shadow 104. The pico station 130 is connected to the core network 102 via a backhaul connection 170. The subscriber stations 150(2) and 150(5) may be connected to the pico station 130 via links that are similar to or the same as the wireless links 190 between subscriber stations 150(1) and 150(4) and the macro base station 110.

In office building 120(2), an enterprise femto base station 140 provides in-building coverage to subscriber stations 150(3) and 150(6). The enterprise femto base station 140 can connect to the core network 102 via an internet service provider network 101 by utilizing a broadband connection 160 provided by an enterprise gateway 103.

The wireless communication system described with respect to FIG. 1A can experience many UL interference scenarios.

Figure 1B:
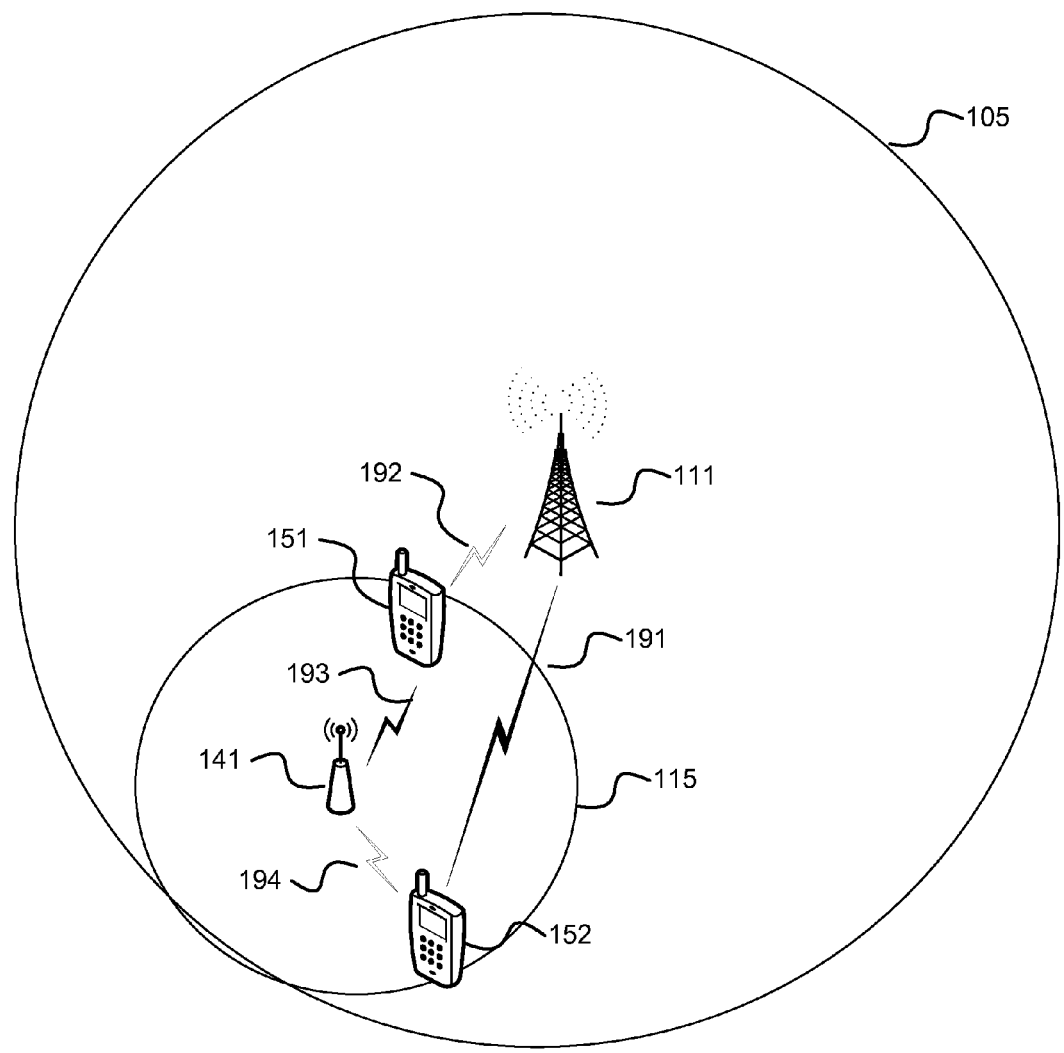
FIG. 1B is a block diagram showing uplink interference scenarios in a communication network in which systems and methods disclosed herein may be implemented in accordance with aspects of the invention.

An additional frequency "reuse one" scenario is depicted in FIG. 1B. As seen in FIG. 1B, macrocell 105 represents the coverage area of macro station 111, which may be for instance macro base station 110 of FIG. 1A, and a femtocell 115 representing the coverage area of femto station 141, which may be an instance of enterprise femto base station 140 of FIG. 1A, or a residential femto base station. UE 151, which may be an instance of subscriber station 150 of FIG. 1A, is part of a closed subscriber group (CSG) defined by access privilege to femto station 141. UE 152, which may be an instance of subscriber station 150 of FIG. 1A, is not part of the CSG of femto station 141 even though it is geographically within the footprint of femtocell 115. This creates what is termed as "the near-far" problem. Macro station 111 may receive a wanted signal 191 from UE 152 with weaker signal strength than it receives an unwanted signal 192 from UE 151. Similarly, femto station 141 receives both a wanted signal 193 from UE 151 and an unwanted signal 194 from UE 152. Because UE 152 is attempting to communicate with the more distant macro station 111, unwanted signal 194 may be stronger than wanted signal 193.

This can be further complicated when there is, for example, another femto station that is within the footprint of macrocell 105 and that shares a cell edge with femtocell 115, thereby allowing an additional interfering source.

Figure 2A:
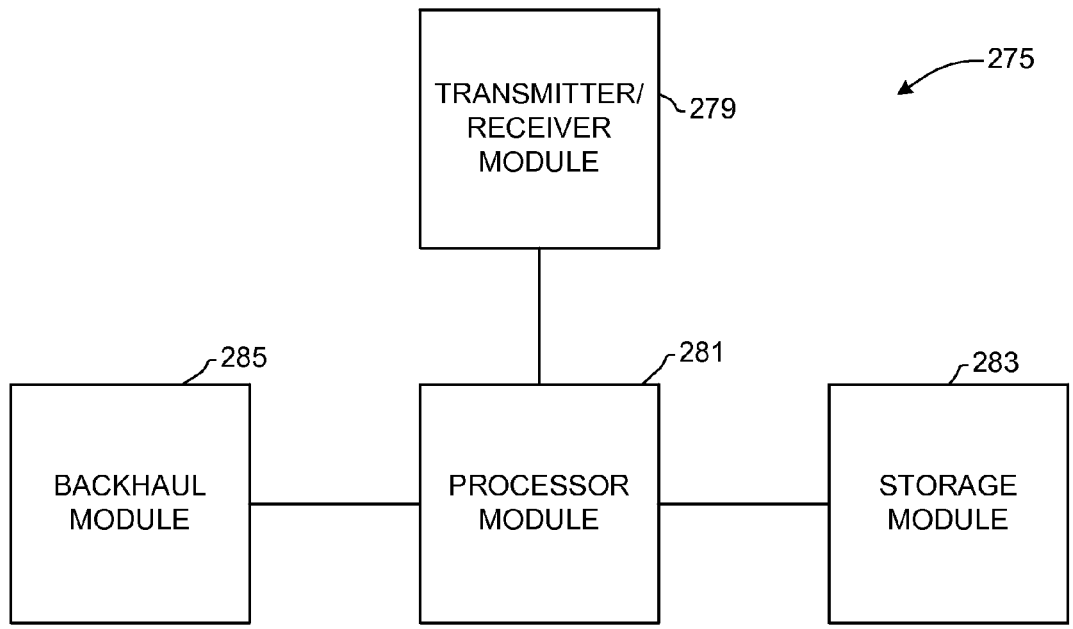
FIG. 2A is a block diagram of an base station in accordance with aspects of the invention.

FIG. 2A is a functional block diagram of a base station 275 in accordance with aspects of the invention. In various embodiments, the base station 275 may be a mobile WiMAX base station, a Universal Mobile Telecommunications System (UMTS) NodeB, an LTE evolved Node B (eNB or eNodeB), or other wireless base station or access point of various form factors. For example, the macro base station 110, the pico station 130, the enterprise femto base station 140 of FIG. 1A, or the macro station 111 or femto station 141 of FIG. 1B may be provided, for example, by the base station 275 of FIG. 2. The base station 275 includes a processor module 281. The processor module 281 is coupled to a transmitter-receiver (transceiver) module 279, a backhaul interface module 285, and a storage module 283.

The transmitter-receiver module 279 is configured to transmit and receive communications wirelessly with other devices. The base station 275 generally includes one or more antennae for transmission and reception of radio signals. The communications of the transmitter-receiver module 279 may be with terminal nodes.

The backhaul interface module 285 provides communication between the base station 275 and a core network. This may include communications directly or indirectly (through intermediate devices) with other base stations, for example to implement the LTE X2 interface. The communication may be over a backhaul connection such as, for example, the backhaul connection 170 of FIG. 1A. Communications received via the transmitter-receiver module 279 may be transmitted, after processing, on the backhaul connection. Similarly, communication received from the backhaul connection may be transmitted by the transmitter-receiver module 279. Although the base station 275 of FIG. 2 is shown with a single backhaul interface module 285, other embodiments of the base station 275 may include multiple backhaul interface modules. Similarly, the base station 275 may include multiple transmitter-receiver modules. The multiple backhaul interface modules and transmitter-receiver modules may operate according to different protocols. Communications originating within the base station 275, such as communications with other base stations, may be transmitted on one or more backhaul connections by backhaul interface module 285. Similarly, communications destined for base station 275 may be received from one or more backhaul connections via backhaul interface module 285.

The processor module 281 can process communications being received and transmitted by the base station 275. The storage module 283 stores data for use by the processor module 281. The storage module 283 may also be used to store computer readable instructions for execution by the processor module 281. The computer readable instructions can be used by the base station 275 for accomplishing the various functions of the base station 275. In an aspect, storage module 283, or parts of the storage module 283, may be considered a non-transitory machine readable medium. For concise explanation, the base station 275 or aspects of it are described as having certain functionality. It will be appreciated that in some embodiments, this functionality is accomplished by the processor module 281 in conjunction with the storage module 283, transmitter-receiver module 279, and backhaul interface module 285. Furthermore, in addition to executing instructions, the processor module 281 may include specific purpose hardware to accomplish some functions.

Figure 2B:
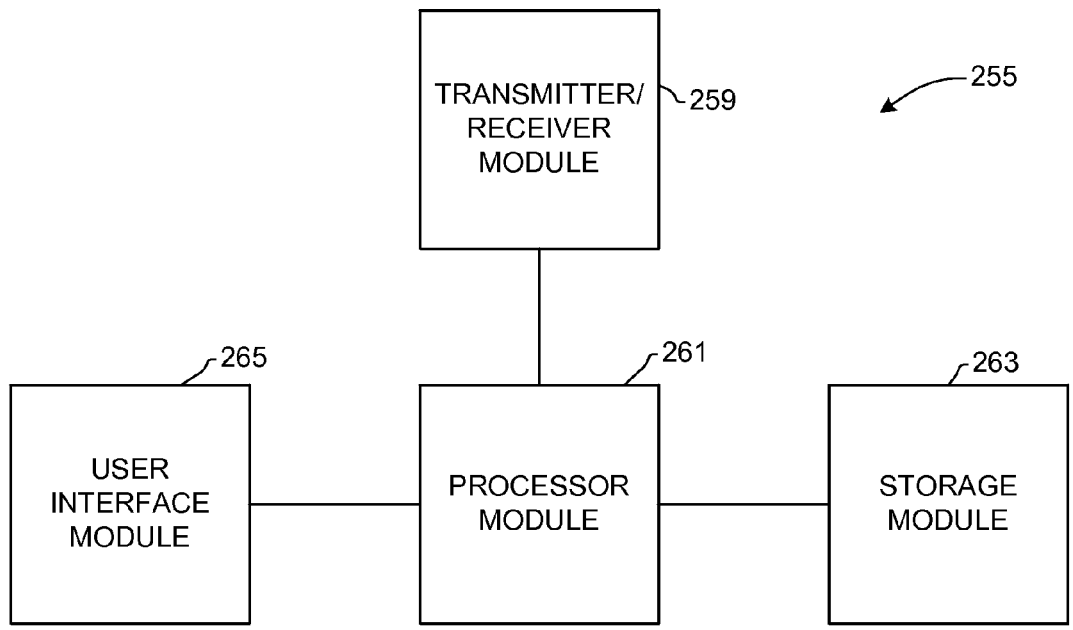
FIG. 2B is a block diagram of a terminal node in accordance with aspects of the invention.

FIG. 2B is a functional block diagram of a terminal node 255 in accordance with aspects of the invention. In various embodiments, the terminal node 255 may be a mobile WiMAX subscriber station, a UMTS cellular phone, an LTE user equipment, or other wireless terminal node of various form factors. The subscriber stations 150 of FIG. 1A or the UEs 151 and 152 of FIG. 1B may be provided, for example, by the terminal node 255 of FIG. 2B. The terminal node 255 includes a processor module 261. The processor module 261 is coupled to a transmitter-receiver module (transceiver) 259, a user interface module 265, and a storage module 263.

The transmitter-receiver module 259 is configured to transmit and receive communications with other devices. For example, the transmitter-receiver module 259 may communicate with base station 275 of FIG. 2A via its transmitter-receiver module 279. The terminal node 255 generally includes one or more antennae (not shown) for transmission and reception of radio signals. Although terminal node 255 of FIG. 2B is shown with a single transmitter-receiver module 259, other embodiments of terminal node 255 may include multiple transmitter-receiver modules. The multiple transmitter-receiver modules may operate according to different protocols.

Terminal node 255, in many aspects, provides data to and receives data from a person (user). Accordingly, terminal node 255 includes user interface module 265. User interface module 265 includes modules for communicating with a person. User interface module 265, in an aspect, includes a speaker and a microphone for voice communications with the user, a screen for providing visual information to the user, and a keypad for accepting alphanumeric commands and data from the user. In some aspects, a touch screen may be used in place of or in combination with the keypad to allow graphical inputs in addition to alphanumeric inputs. In an alternative aspect, user interface module 265 includes a computer interface, for example, a universal serial bus (USB) interface, to interface terminal node 255 to a computer. For example, terminal node 255 may be in the form of a dongle that can be connected to a notebook computer via user interface module 265. The combination of computer and dongle may also be considered a terminal node. User interface module 265 may have other configurations and include functions such as vibrators, cameras, and lights.

Processor module 261 can process communications being received and transmitted by terminal node 255. Processor module 261 can also process inputs from and outputs to user interface module 265. Storage module 263 stores data for use by processor module 261. Storage module 263 may also be used to store computer readable instructions for execution by processor module 261. The computer readable instructions may be used by terminal node 255 for accomplishing the various functions of terminal node 255. In an embodiment, storage module 263, or parts of storage module 263, may be considered a non-transitory machine readable medium. For concise explanation, terminal node 255 or aspects of it are described as having certain functionality. It should be appreciated that in some aspects, this functionality is accomplished by processor module 261 in conjunction with storage module 263, transmitter-receiver module 259, and user interface module 265. Furthermore, in addition to executing instructions, processor module 261 may include specific purpose hardware to accomplish some functions.

Information is passed from an assisting base station to a requesting base station that is requesting additional help in resolving UL interference and decoding a received signal. This turns the UL signal resolution problem into a "n source, n sensor" problem (or "n equations and n unknowns") allowing use of techniques such as joint decoding, which is also used in UL multiple-input multiple-output (MIMO), to separate out the UL signals and allow decoding of the data. Unlike UL MIMO, however, the UL transmissions are not coordinated other than the fact that the base stations benefit from being time synchronized to the level of tolerance of the orthogonal frequency-division multiplexing (OFDM) symbol preamble, which is already necessary for evolved multimedia broadcast multicast service (eMBMS) and CoMP, in LTE systems and is beneficial for handover in most wireless systems. Additionally, unlike UL MIMO, the multiple UL signals are received by different base stations rather than by different antenna provided on a single base station. As such, UL Tx power, modulation, and coding are not coordinated and neither is the choice of the interfering UE.

Figure 3:
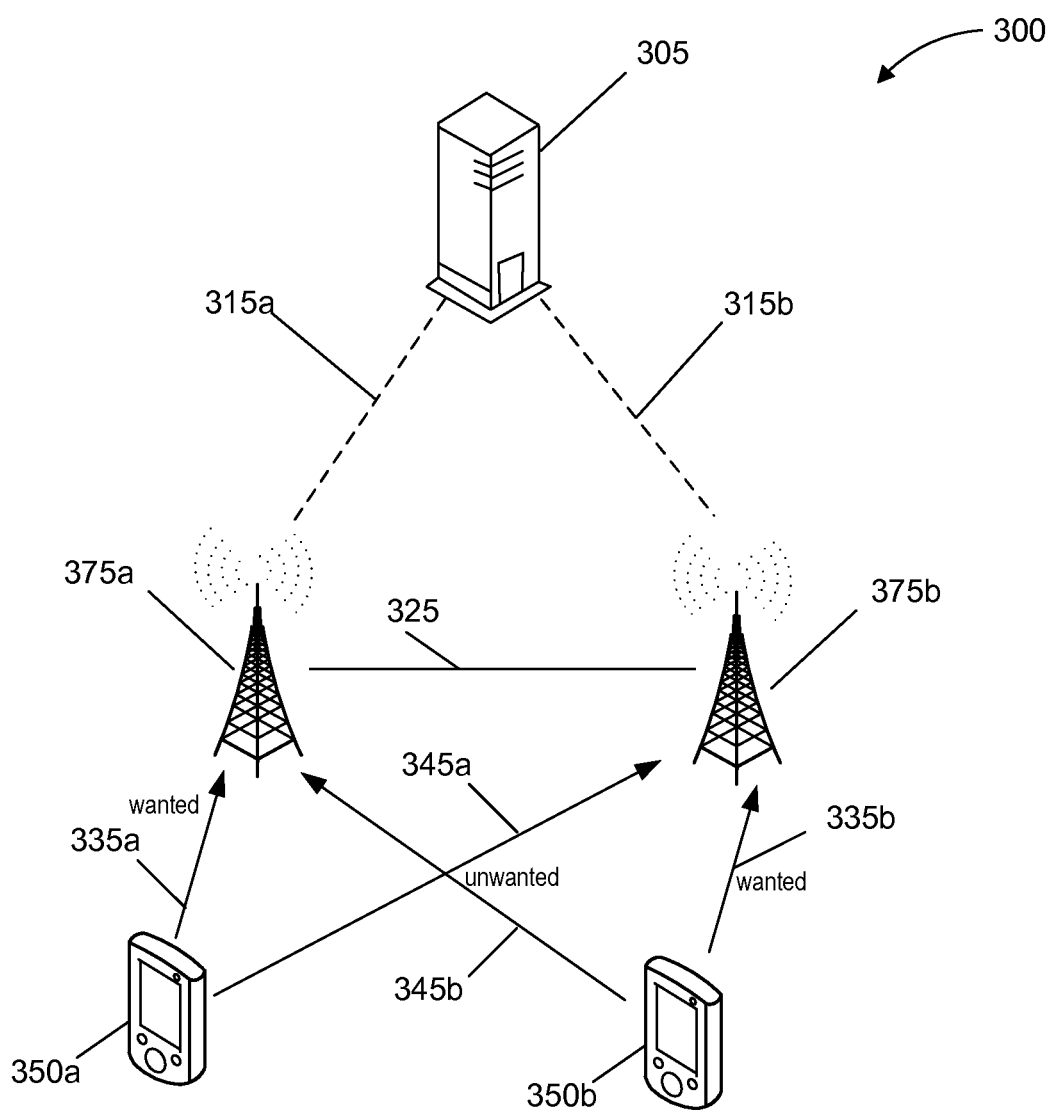
FIG. 3 is a block diagram of a communication system depicting neighboring base stations that communicate with each other to exchange information in accordance with aspects of the invention.

FIG. 3 is a block diagram of an exemplary communication system 300 in accordance with aspects of the invention. Communication system 300 depicts neighboring base stations that communicate with each other to exchange information on an on-demand basis to aid in the resolution of interference and the decoding of received signals, thereby allowing more efficient communication parameters to be used.

In a given timeslot/subcarrier allocation, such as a physical resource block (PRB) in LTE or a tile in WiMAX, base station 375a may receive a combination of wanted signal 335a from UE 350a and unwanted signal 345b from UE 350b. Similarly, base station 375b may receive a combination of wanted signal 335b from UE 350b and unwanted signal 345a from UE 350a. This may cause one or the other or both of base stations 375a and 375b to be unable to decode their respective wanted signal.

Unlike UL multi-user (MU) MIMO, neither base station by itself has received both versions of the combined signals. That is to say that neither base station by itself has received the signal representing the combination of wanted signal 335a and unwanted signal 345b and has also received the signal representing the combination of wanted signal 335b and unwanted signal 345a. However, if a base station, for example base station 375a, fails to correctly decode the wanted signal 335a in a particular PRB or tile, there may be enough information in the overall system 300 to correct the decoding. Base station 375a and its neighbors, for example base station 375b, both have a received signal, even if they are not able to decode that signal.

Both may know information about the PRB in question for their wanted signal. Such information may include, for example, in an OFDM or single-carrier frequency-division multiple access (SC-FDMA) system the output of the fast Fourier transform (FFT), the output of the resource demapper, a channel estimate, expected reference signals or preambles, etc.

A base station may or may not know its neighbors, wherein a neighbor is defined as any other base station with sufficient cell coverage overlap to have the potential to cause the base station to fail to decode its UL received signal. When base station 375a incorrectly decodes a PRB or tile, if it has sufficient processing resources and knows it is in communication with its neighbors, it may ask its neighbors for the baseband signals that they received for the same PRB or tile, or some properly preprocessed form. The request may be over a communication path 325 established for base station to base station communication, for example the X2 interface in an LTE system. Base station 375a may also ask the neighbor for additional parameters of the neighbors wanted signal, such as modulation, coding, and reference signal parameters. Base station 375a may then use one of the techniques described below to improve the decoding of its own wanted signal.

If base station 375a does not know its neighbors, cannot communicate directly with its neighbors, or lacks sufficient processing, it may request a central entity 305, such as a network management system (NMS) or gateway in core network 102 of FIG. 1A, to request the necessary data and even to perform the requisite processing. Central entity 305 communicates with base station 375a over communication path 315a such as, for example, a backhaul connection like backhaul connection 170 of FIG. 1A, and also communicates with base station 375b over communication path 315b, for example a second backhaul connection. One skilled in the art would understand that the communication between a base station and a central entity 305 may take many forms.

In both scenarios, unlike MIMO, the additional signal information is only made available on an "as requested" basis when initial decoding attempts of the wanted signal by the base station fail.

This method trades some occasional processing delay for a reduced need to use spectrally inefficient methods to mitigate UL interference.

Figure 4:
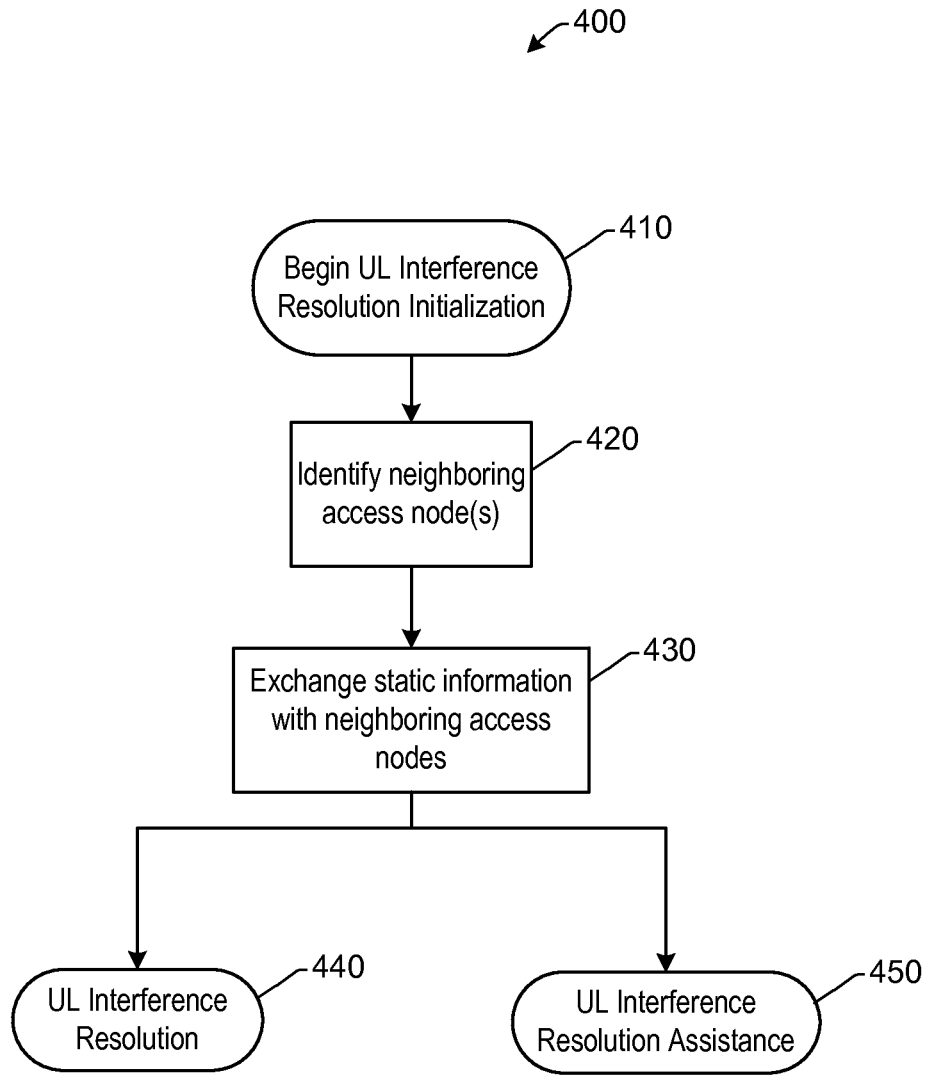
FIG. 4 is a flowchart illustrating an exemplary method for initialization of a base station to perform on-demand uncoordinated interference resolution according to an aspect of the invention.

FIG. 4 shows flowchart 400 which depicts a method for initialization of a base station, such as any one of the base stations (macro, femto, or pico) depicted in FIG. 1A, 1B, 2A, or 3, in preparation for performing on-demand uncoordinated interference resolution according to exemplary aspects of the invention.

The method starts at step 410 after the base station has powered up. At step 420, the base station identifies its neighboring base stations. This may be accomplished in a number of ways. Some protocols allow a base station to monitor the downlink to detect neighbors. Some protocols allow a base station to use information from user equipment with which it is communicating to detect and report neighbors. Some systems may provide neighbor information through communication with a central entity, such as central entity 305 in FIG. 3, which is cognizant of the current network topology.

At step 430, the base station exchanges static information with its neighbors that is useful for interference resolution. Such information may include, for instance, hopping sequences or information regarding reference signals. Such information could alternatively be requested, on-demand, as part of the information exchanged at the time of interference resolution. Such exchange could also be performed periodically or as needed as the parameters change. Such information could alternatively be provided by a central entity.

After step 430, the base station operates according to one or both of two methods which may be simultaneous. The base station may proceed to step 440 where it performs on-demand UL interference resolution of its own received signal (as described further below in the flowchart 500 of FIG. 5). Alternatively or simultaneously, the base station may proceed to step 450 where it performs on-demand UL interference resolution assistance to aid one or more neighboring base stations in resolving interference of their received signals (as described further below in the flowchart 600 of FIG. 6). These processes are now described below with respect to FIG. 5 and FIG. 6.

Figure 5:
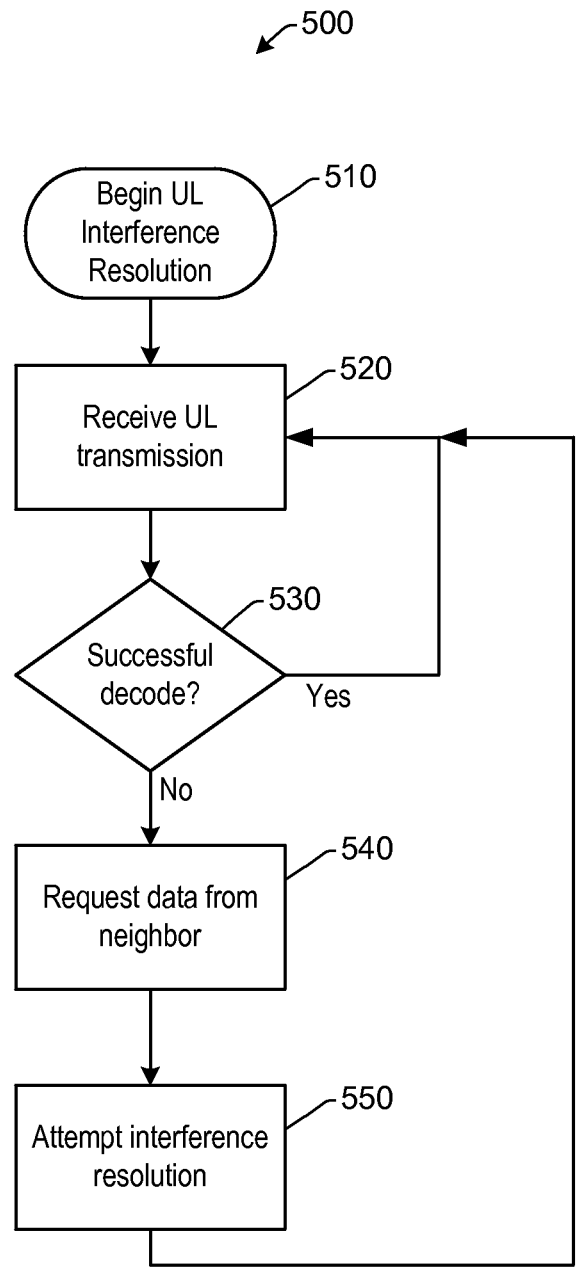
FIG. 5 is a flowchart illustrating an exemplary method for performing on-demand uncoordinated interference resolution according to an aspect of the invention.

FIG. 5 shows a flowchart 500 depicting a method for performing on-demand uncoordinated interference resolution according to exemplary aspects of the invention.

The method starts at step 510, such as after the base station initialization process (step 440) of FIG. 4. At step 520, the base station receives an uplink transmission from a user device and attempts to decode the signal. At step 530, it is determined if the decode was successful. If the decode was successful, there is no need to request additional information from a neighboring base station and the process returns to step 520. If, at step 530, it was determined that the signal was not correctly decoded, the process proceeds to step 540. Determining whether decoding was performed error free may use techniques well known in the art, such as error vector magnitude (EVM), bit error rate (BER) calculation, successful decoding of forward error correction (FEC) coding, and successful checking of checksums or cyclic redundancy checks (CRC).

At step 540, the base station requests additional data and information from one or more neighboring base stations, such as the neighbor's output of a resource demapper for the resources in question and the neighbor's expected reference signals. In an aspect, this information may be requested and received through a central entity. Then at step 550, the base station uses its received signal and known information in combination with the data and information received from one or more neighboring base station to attempt to resolve interference and decode the received UL signal. Whether the decoding attempt is successful or not, the process returns to step 520.

One skilled in the art would understand that the information from both the base station attempting interference resolution and the base station assisting with the other base station's interference resolution may be passed to a central entity which may perform the decoding calculations.

Figure 6:
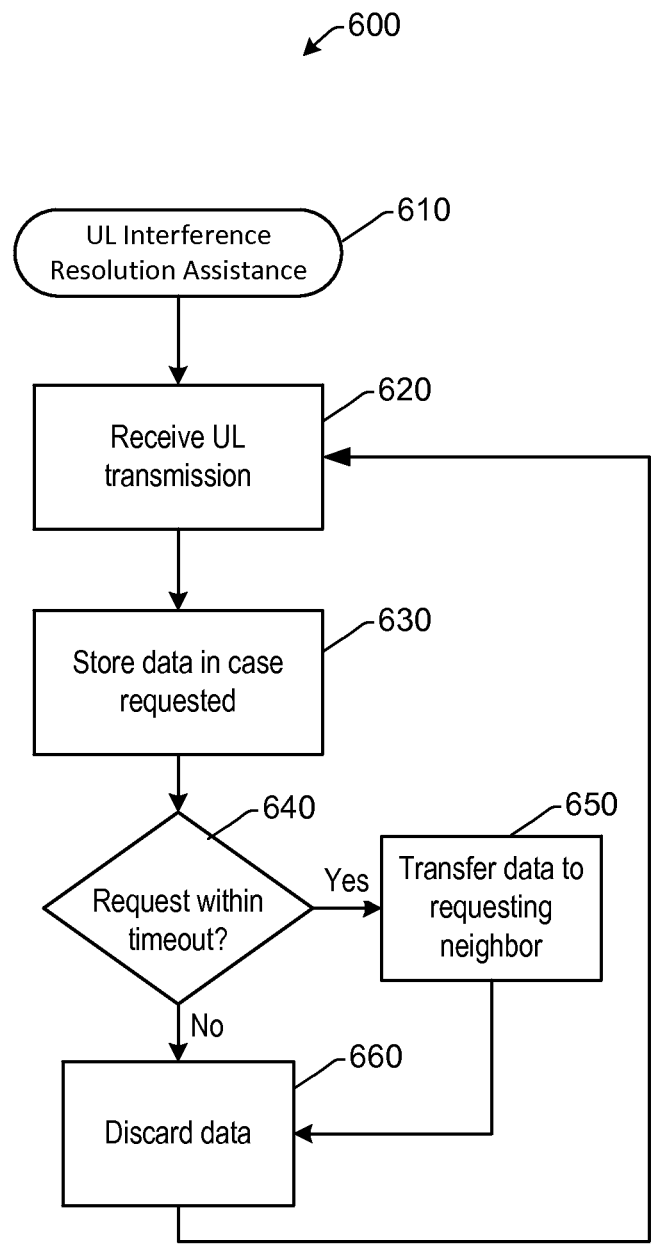
FIG. 6 is a flowchart illustrating an exemplary method for performing on-demand uncoordinated interference resolution assistance according to an aspect of the invention.

FIG. 6 shows flowchart 600 depicting a method for performing on-demand uncoordinated interference resolution assistance according to exemplary aspects of the invention.

The method starts at step 610, such as after the base station initialization process (step 450) of FIG. 4. At step 620, the base station receives an uplink transmission from a user device. One of ordinary skill in the art would understand that if the base station performing on-demand uncoordinated interference resolution assistance (the "assisting base station") as described in flowchart 600 is also performing on-demand uncoordinated interference resolution as described in flowchart 500, step 620 of flowchart 600 may be a part of step 520 of flowchart 500. However, to be of additional assistance, at step 620, the assisting base station may activate its receiver to receive an uplink signal on certain uplink resources even if the assisting base station does not expect a transmission from a user device on those uplink resources, which would not need to be the case for step 520 of flowchart 500.

After reception of an uplink signal in step 620 the process moves to step 630 where the data is stored by the assisting base station in case a neighboring base station requests it, for instance in storage module 283 of FIG. 2A. At step 640, if a neighboring base station requests to obtain the received UL data and information from the assisting base station before a timeout period has expired, the process moves to step 650 where the data is transferred from assisting base station to the requesting neighbor base station. It should be understood that the request could be from a central entity on behalf of the neighboring base station, such as central entity 305 of FIG. 3, rather than directly from the neighboring base station. If at step 640, a timeout expires prior to the data being requested (or after transfer of the data to a neighbor or central entity at step 650), the process moves to step 660 in which the base station may delete the expired or already transferred data to free storage for the saving of more UL data received by the assisting base station.

The LTE uplink uses SC-FDMA, which is OFDM with an additional FFT precoder, and is divided in time into 0.5 millisecond (ms) slots. Each slot is comprised in time of 7 OFDM symbols using the normal cyclic prefix and 6 OFDM symbols using the extended cyclic prefix. In frequency, a slot is comprised of some number of 15 kilohertz (kHz) subcarriers. For instance a 5 megahertz (MHz) wide channel is comprised of 300 subcarriers taking 4.5 MHz of the channel bandwidth and a 10 MHz channel is comprised of 600 subcarriers taking 9 MHz of the channel bandwidth, leaving a guard band between channels. Physical resource blocks are defined as 12 contiguous subcarriers across all 6 or 7 OFDM symbols of a slot. A PRB is the smallest unit of uplink bandwidth allocation given to a UE.

Throughout this document it is assumed that LTE is used with a normal cyclic prefix (i.e., 7 OFDM symbols per 0.5 ms slot) as an example, but one skilled in the art would understand how to apply the invention to the extended cyclic prefix case and to non-LTE OFDM or SC-FDMA based technology.

Figure 7A:
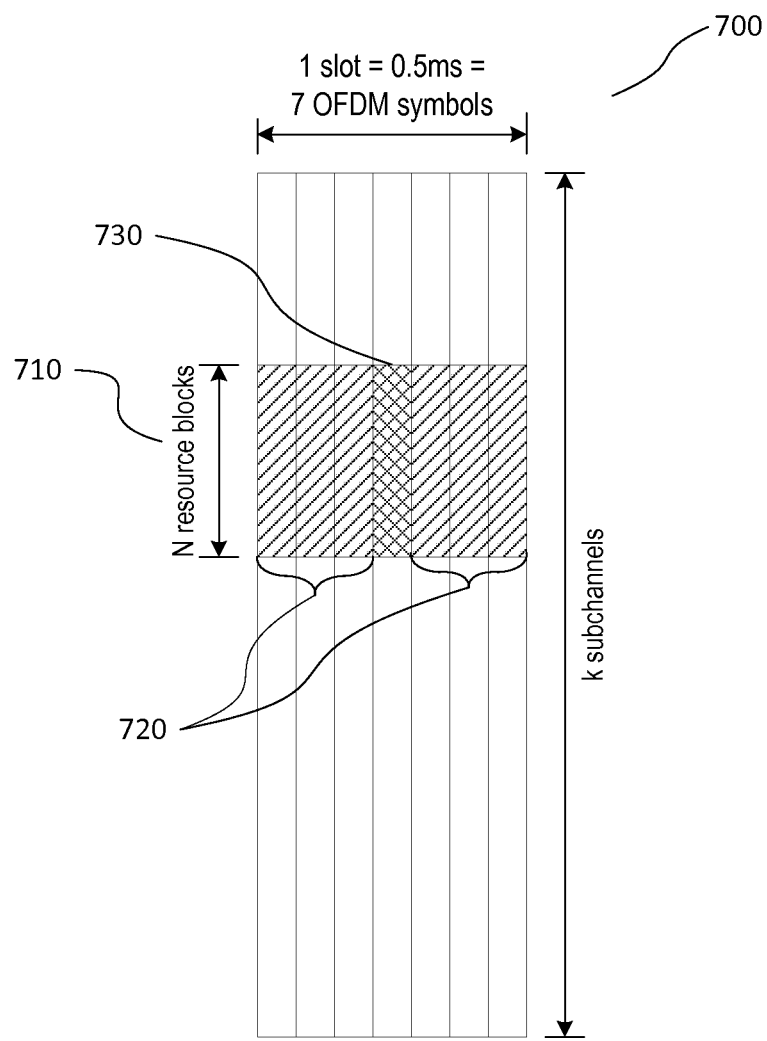
FIG. 7A is a block diagram depicting an uplink transmission in subcarriers of a slot according to an aspect of the invention.

FIG. 7A is a block diagram depicting an uplink transmission in subcarriers of a slot according to an aspect of the invention. The physical uplink shared channel (PUSCH) transmission 710 in a slot 700 by a first user equipment (UE) to a first base station (eNodeB) is depicted in FIG. 7A. The PUSCH transmission 710 spans N PRBs (12×N subcarriers) in frequency and the entire slot duration in time. In LTE, the N resource blocks are allocated to be contiguous in frequency. The PUSCH transmission 710 is comprised of a data element 720, which may have its allocated subcarriers separated by a reference signal 730.

Figure 7B:
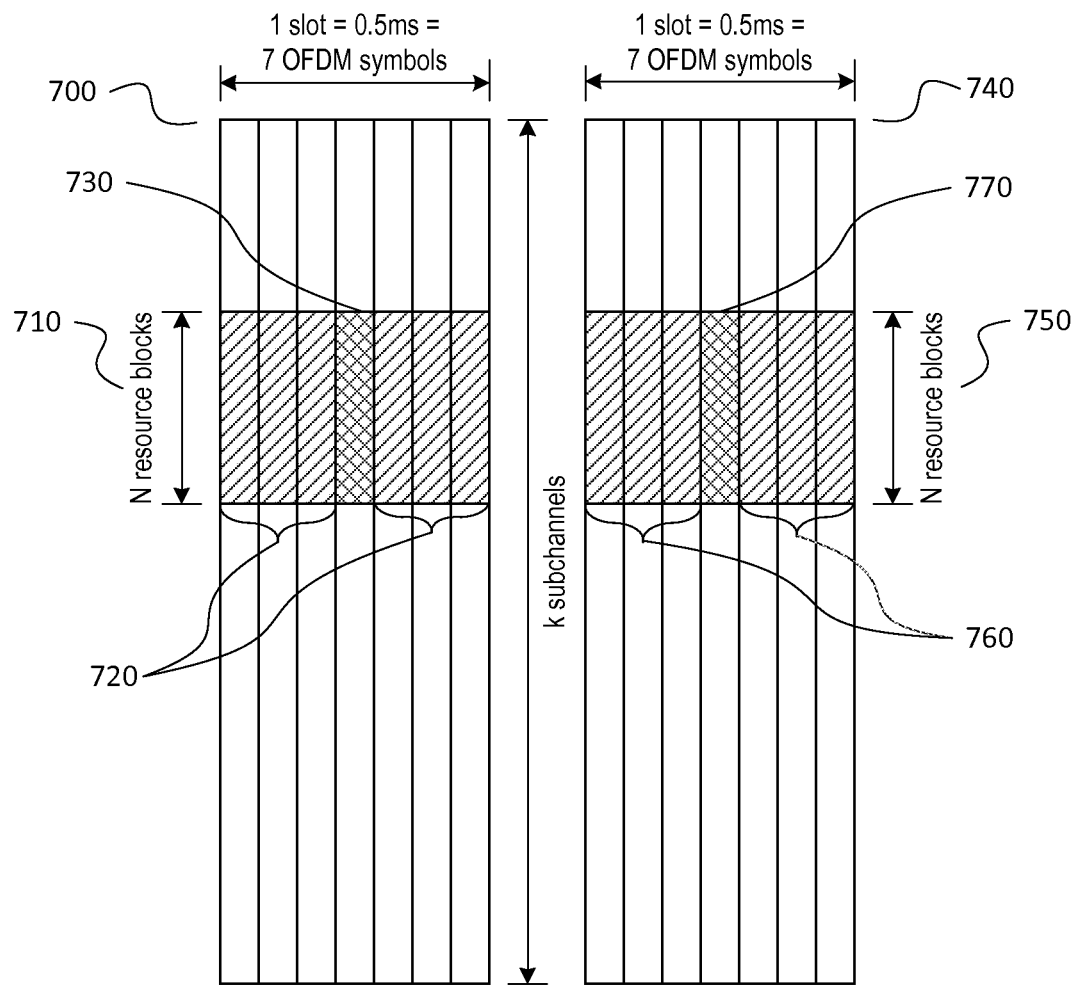
FIG. 7B is a block diagram depicting an uplink transmission in subcarriers of a slot from one user equipment to one LTE eNodeB and an interfering LTE uplink transmission from a second user equipment to a second LTE eNodeB according to an aspect of the invention.

FIG. 7B shows the same PUSCH transmission 710 by a first UE in slot 700 to a first eNodeB as was shown in FIG. 7A. FIG. 7B also shows a co-channel PUSCH transmission 750 in slot 740, which is coincidental in time with slot 700, to a second eNodeB. PUSCH transmission 750 has the same structure of data element 760, reference signal 770, and the same number of resource blocks, N, on the same subcarriers as PUSCH transmission 710, causing interference. However, the reference signal 770 may have been derived from a different Zadoff-Chu sequence or from some other reference signal (e.g., a quadrature phase-shift keying (QPSK) reference sequence such as described in the LTE standard) and the data element likely may contain different data. Also, the transmissions may use different modulation and coding.

Figure 7C:
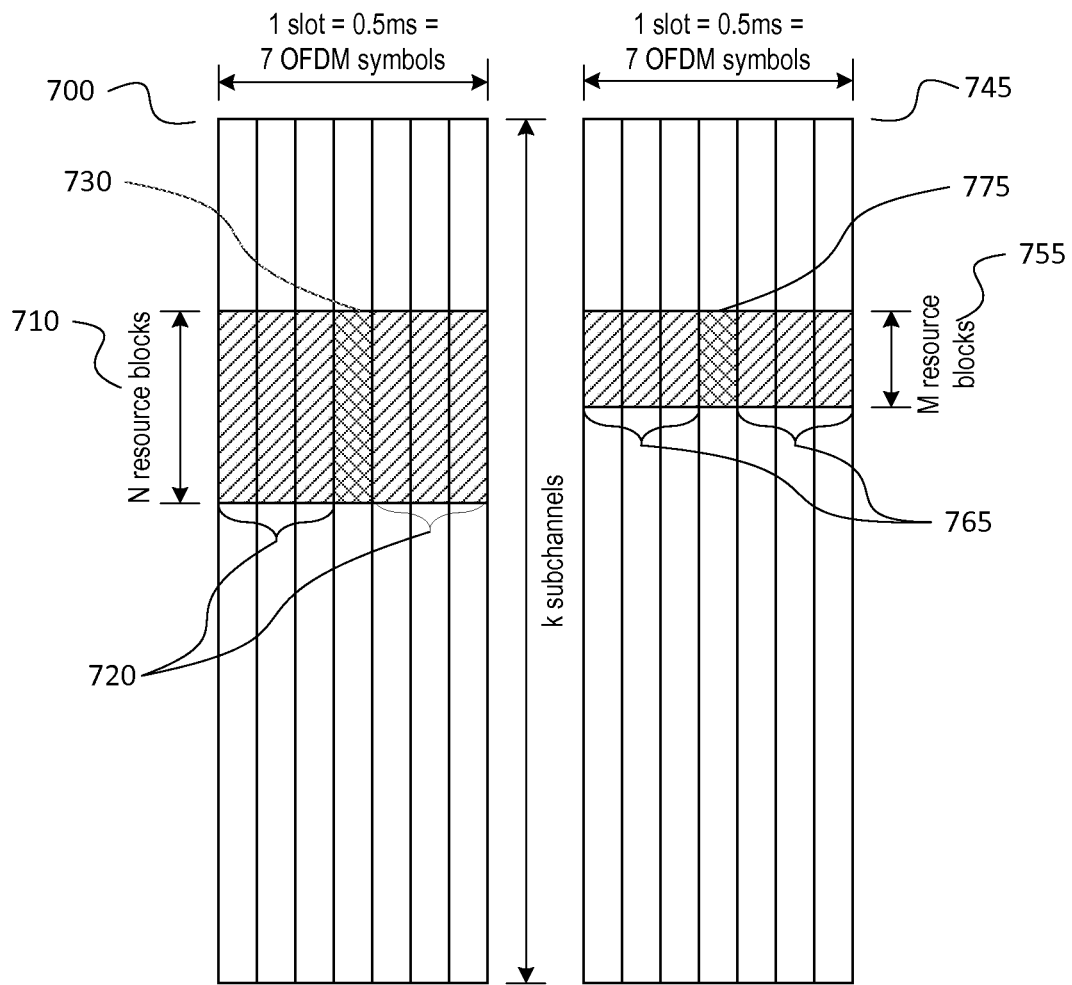
FIG. 7C is a block diagram depicting an LTE uplink transmission in subcarriers of a slot from one user equipment to one LTE access node (eNodeB) and an interfering LTE uplink transmission from a second user equipment to a second LTE eNodeB according to an aspect of the invention.

FIG. 7C shows the same PUSCH transmission 710 by a first UE in slot 700 to a first eNodeB as was shown in FIG. 7A. FIG. 7C also shows a co-channel PUSCH transmission 755 in slot 745, which is coincidental in time with slot 700, to a second eNodeB. PUSCH transmission 755 has a similar structure of data element 765, and reference signal 775, however, the number of resource blocks, M (12×M subcarriers), is fewer than in PUSCH transmission 710, but still overlaps with PUSCH transmission 710, causing interference. The reference signal 775 may have been derived from a different Zadoff-Chu sequence or from some other reference signal (e.g., a QPSK reference sequence such as described in the LTE standard) and the data element likely may contain different data. Also, the transmissions may use different modulation and coding.

One skilled in the art would understand that other PUSCH transmission scenarios exist in which a second UE, or multiple other UEs, transmits co-channel to a first UE, in the same slot and with overlapping resource block allocations.

Figure 8:
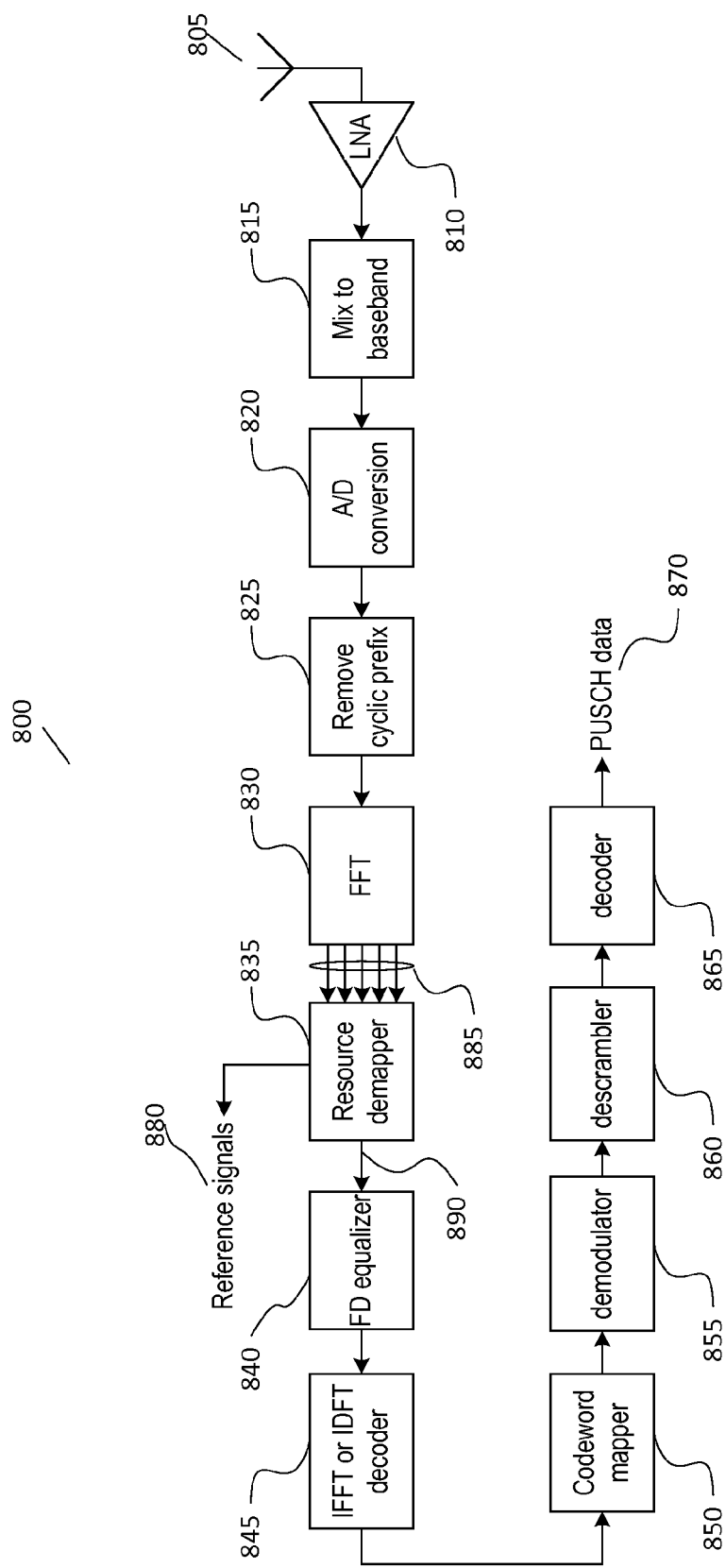
FIG. 8 is a block diagram depicting a receiver according to an aspect of the invention.

FIG. 8 is a block diagram depicting an SC-FDMA receiver 800 according to exemplary aspects of the invention. As seen in FIG. 8, received signal 805 is processed through a chain of modules to obtain a desired decoded uplink transmission (PUSCH). The modules and the processing performed by the modules may be referred to as stages. The chain of modules in FIG. 8. include low-noise amplifier (LNA) 810, mixer module 815, A/D conversion module 820, cyclic prefix remover module 825, FFT module 830, resource demapper module 835, frequency domain (FD) equalizer module 840, inverse fast Fourier transform (IFFT)/inverse discrete Fourier transform (IDFT) decoder module 845, codeword mapper module 850, demodulator module 855, descrambler module 860, and decoder module 865. In the exemplary aspect shown in FIG. 8, FFT module 830 takes the digital baseband signal and converts it to the frequency domain with FFT outputs 885 for each [subcarrier, OFDM symbol] pair. From the FFT outputs 885, the resource demapper module 835 extracts the reference signal 880, for instance reference signal 730 of FIG. 7A, and data elements 890, for instance data element 720 of FIG. 7A, from each user equipment's uplink transmission, for instance PUSCH transmission 710 of FIG. 7A. According to aspects of the invention, to aid in the extraction, the information in the subcarriers corresponding to an individual UL transmission's reference signal OFDM symbol is correlated with the expected reference signal to acquire the channel transfer function for the UL transmission.

The receiver portion of transmitter-receiver (transceiver) module 279 of base station 275 shown in FIG. 2A, may be implemented as receiver 800, according to an exemplary aspect of the invention.

Figure 9:
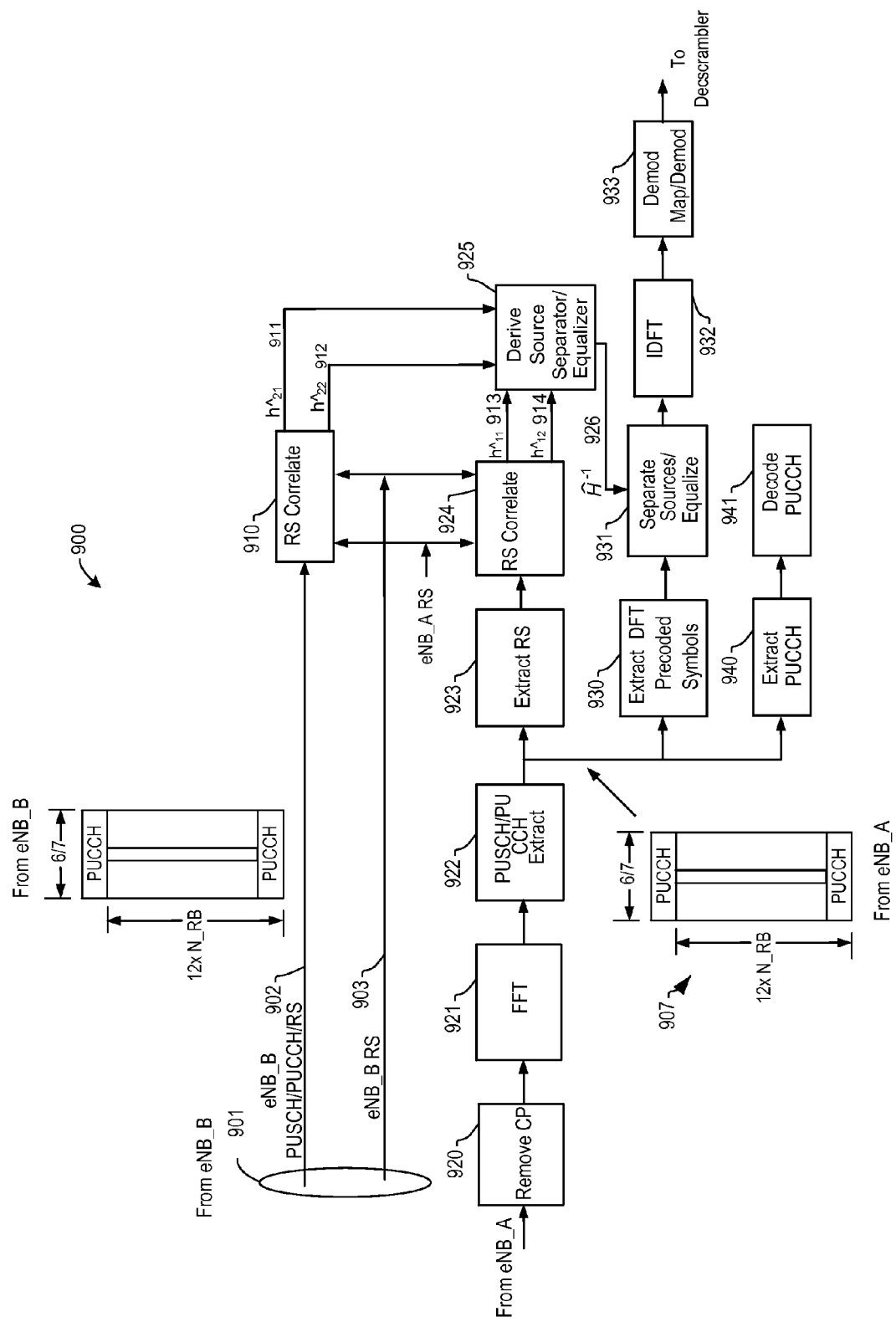
FIG. 9 is a functional block diagram depicting a receiver according to an aspect of the invention.

FIG. 9 is a block diagram depicting functional aspects of a receiver in a base station (eNB_A) according to exemplary aspects of the invention. In the exemplary aspect depicted in FIG. 9, receiver 900 uses information and data obtained from a neighboring base station (eNB_B) in order to resolve interference and thereby extract a desired uplink transmission received by receiver 900. In FIG. 9, information and data 901 obtained from the neighboring base station eNB_B may include eNB_B PUSCH/physical uplink control channel (PUCCH)/reference signal (RS) 902 and eNB_B RS 903 that are associated with a relevant uplink transmission that was received by eNB_B. For example, eNB_B PUSCH/PUCCH/ RS 902 may be the actual data (PUSCH), control information (PUCCH) and RS as received by eNB_B, which may have been extracted from a point in the receiver chain of eNB_B, such as after the FFT processing of the received uplink transmission. eNB_B RS 903 is the expected RS from eNB_B, which is the RS that eNB_B expects to receive in the uplink transmission. The expected RS and the actual RS are used on RS correlate modules 910 and 924 to determine channel transfer function components as described in more detail below.

In the example depicted in FIG. 9, receiver 900 is provided in eNB_A and has received a combination of uplink signals comprised of a wanted uplink transmission from a first UE and an unwanted interfering uplink transmission from another UE, as explained above with respect to FIG. 3. Receiver 900 begins processing of eNB_A's received uplink signal combination by mixing it to baseband and performing A/D conversion (not shown) and then removing the cyclic prefix in module 920. In block 921, FFT is performed and then the eNB_A's "actual" received PUSCH/PUCCH/RS 907 is extracted in module 922. The eNB_A "actual" received PUSCH/PUCCH/RS 907 is then provided to modules 923, 930 and 940. Module 923 extracts the actual eNB_A reference signal (RS) from the eNB_A "actual" received PUSCH/PUCCH/RS 907. The extracted eNB_A RS is passed to RS correlate module 924 to assist with correlation of the expected RS signal. In RS correlate modules 910 and 924, RS correlation between the expected RS and the actual RS from eNB_A and eNB_B is performed. RS correlation modules 924 and 910 each have the expected RS from both eNB_A and eNB_B. In this regard, RS correlate module 910 correlates the "expected" eNB_A RS with the "actual" received eNB_B RS and correlates the "expected" eNB_B RS with the "actual" received eNB_B RS, to determine $\hat{h}_{21}$ (911) and $\hat{h}_{22}$ (912) (the channel transfer function components for the unwanted and wanted signals received by eNB_B, respectively). Similarly, RS correlate module 924 correlates the "expected" eNB_A RS with the "actual" received eNB_A RS and correlates the "expected" eNB_B RS with the "actual" received eNB_A RS, to determine $\hat{h}_{11}$ (913) and $\hat{h}_{12}$ (914) (the channel transfer function components for the wanted and unwanted signals received by eNB_A, respectively).

The channel transfer function components $\hat{h}_{11}$, $\hat{h}_{12}$, $\hat{h}_{21}$ and $\hat{h}_{22}$ are provided to module 925 which uses the components to derive a source separator/equalizer through standard techniques including Zero Forcing (ZF). The derived source separator/equalizer output from module 925 is depicted as $H^{-1}$ 926. Returning to module 930, DFT precoded symbols are extracted from the eNB_A PUSCH/PUCCH/RS 907 and the result is passed to module 931. In module 931, the derived $H^{-1}$ 926 from module 925 is used to separate the source signals from the combined received signal at eNB_A and to perform equalization, by utilizing the actual received eNB_B data portion (PUSCH) from eNB_B PUSCH/PUCCH/RS 902. In this regard, the actual received eNB_B data portion (PUSCH) is provided to module 931 to assist with the source separation processing (this connection is not shown in FIG. 9 for the sake of clarity of the figure). At this point, the receiver 900 now has extracted the desired uplink PUSCH transmission and then passes it for normal receiver processing in IDFT module 932 and demodulation module 933, the result of which is sent to a descrambler and decoder (not shown). It can be appreciated that modules 930-933 of receiver 900 are for extracting and processing the data PUSCH of the wanted uplink transmission. Modules 940 and 941 may be used to extract and decode the control information (PUCCH) from eNB_A PUSCH/PUCCH/RS 907.

An exemplary aspect of interference resolution is now described with reference to FIG. 3 using the below equation:

$$y_{i,j} = h_{i,j}^d x_{i,j}^d + h_{i,j}^u x_{i,j}^u + n_{i,j} \quad (1)$$

in which $y_{i,j}$ is the 1×1 channel output (e.g., data elements 890), $x_{i,j}^d$ is the 1×1 frequency domain resource element value from wanted signal 335a from the desired first UE 350a. $h_{i,j}^d$ is the 1×1 channel transfer function between the desired first UE 350a and the first base station 375a receiver. $x_{i,j}^u$ is the frequency domain resource element value from interfering second UE 350b. $h_{i,j}^u$ is the 1×1 channel transfer function between the interfering second UE 350b, and the first base station 375a receiver, and $n_{i,j}$ is the 1×1 noise value. The result of trying to solve for $x_{i,j}^d$ may be impaired by interference of the unwanted signal 345a from interfering second UE 350b and noise.

If interference and noise are within bounds, error tolerance and correction in demodulation and decoding can properly reconstruct the original input data from the impaired $x_{i,j}^d$. If the original data cannot be reconstructed, additional information within system 300 is needed.

The received signal at a neighboring second base station 375b can be written as the equation:

$$y'_{i,j} = h_{i,j}^{d'} x_{i,j}^d + h_{i,j}^{u'} x_{i,j}^u + n'_{i,j} \qquad (2)$$

in which $y'_{i,j}$ is the 1×1 channel output symbols value, $h_{i,j}^{d'}$; is the 1×1 channel transfer function value between the desired first UE 350a and the neighboring second base station 375b receiver, $h_{i,j}^{u'}$ is the 1×1 channel transfer function between the interfering second UE 350b and the neighboring second base station 375b receiver, and $n'_{i,j}$ is the 1×1 noise value.

Availability to the first base station 375a of the signal received by an assisting neighboring second base station 375b has the potential of significantly increasing the decoding performance at first base station 375a. To facilitate this, first base station 375a (the "requesting base station") is operated as described in flowchart 500 of FIG. 5 and neighboring second base station 375b (the "assisting base station") is operated as described in flowchart 600 of FIG. 6. Note that they may also simultaneously operate such that the first base station 375a is also assisting the second base station 375b on an on-demand basis.

For each UL transmission (i.e. subcarriers across OFDM symbols) received in a slot, second base station 375b stores its frequency domain data elements, $y'_{i,j}$ (e.g. data elements 890) and both the received and expected reference signal. If a request is received from first base station 375a before a timeout, second base station 375b sends the frequency domain data elements $y'_{i,j}$ and the received and expected reference signal for the UL transmissions it has received that overlap the UL transmission subcarriers requested by the first base station 375a.

For each UL transmission received in a slot that first base station 375a attempts to decode but cannot, first base station 375a requests the frequency domain data elements $y'_{i,j}$ and received and expected references signals for UL transmissions received by neighboring second base station 375b that overlap the un-decodable UL transmission.

In an alternate aspect, frequency domain data elements $y'_{i,j}$ and received and expected references signals for UL transmissions are transferred as one data element. In an alternate aspect, neighboring second base station 375b sends first base station 375a the output of the second base station 375b's FFT (some or all subcarriers) for all OFDM symbols and lets first base station 375a extract the frequency domain data elements $y'_{i,j}$ from the demapper. In an alternate aspect, neighboring second base station 375b sends first base station 375a information sufficient to create the expected reference signals rather than the actual expected reference signals. The on-demand aspect of this method minimizes the amount of additional data transferred.

With frequency domain data elements, $y'_{i,j}$ and expected reference signal from neighboring second base station 375b, the ambiguity of the interference element, $h_{i,j}^{u'} x_{i,j}^u$ of equation 1 can be eliminated.

First base station 375a now desires to resolve the following equation (3):

$$\begin{bmatrix} y_{i,j} \\ y'_{i,j} \end{bmatrix} = \begin{bmatrix} h_{i,j}^d & h_{i,j}^u \\ h_{i,j}^{d'} & h_{i,j}^{u'} \end{bmatrix} \begin{bmatrix} x_{i,j}^d \\ x_{i,j}^u \end{bmatrix} + \begin{bmatrix} n_{i,j} \\ n'_{i,j} \end{bmatrix} \triangleq y = H_{i,j} x + n \qquad (3)$$

As described above, first base station 375a knows $y_{i,j}$, $y'_{i,j}$, and $h_{i,j}^d$ from a combination of the functionality of its receiver and from the request to neighboring base station 375b.

With the expected and received reference signals from neighboring second base station 375b, first base station 375a has enough information to estimate the matrix H in Equation 3.

First base station calculates:
1) $h_{11}$ by correlating the reference signal extracted (e.g., 880) by its receiver with the reference signal it expected to be used by UE 350a;
2) $h_{12}$ by correlating the reference signal extracted by its receiver with the reference signal neighboring second base station 375b expected to be used by UE 350b;
3) $h_{21}$ by correlating the reference signal extracted by neighboring second base station 375b with the reference signal it expected to be used by UE 350a; and
4) $h_{22}$ by correlating the reference signal extracted by neighboring second base station 375b with the reference signal neighboring second base station 375b expected to be used by UE 350b.

First base station 375a has matrix Y, and $\hat{H}$, and uses it as an estimate of matrix H in equation (3), as shown in Equation 4.

$$\begin{bmatrix} y_{i,j} \\ y'_{i,j} \end{bmatrix} \cong \begin{bmatrix} h_{11} & h_{12} \\ h_{21} & h_{22} \end{bmatrix} \begin{bmatrix} x_{i,j}^d \\ x_{i,j}^u \end{bmatrix} + \begin{bmatrix} n_{i,j} \\ n'_{i,j} \end{bmatrix} \triangleq y = \hat{H}_{i,j} x + n \qquad (4)$$

$$Y = HX + N. \text{ Then } \hat{X} = \hat{H}^{-1} Y = \hat{H}^{-1} HX + \hat{H}^{-1} N \qquad (5)$$

If interference and noise are within bounds, error tolerance and correction in demodulation and decoding can properly reconstruct the original input data from the impaired version of $x_{i,j}^d$ in $\hat{X}$.

In a second exemplary aspect, neighboring second base station 375b measures channel transfer functions $h_{i,j}^{d'}$ and $h_{i,j}^{u'}$, and furnishes them to first base station 375a on request along with $y'_{i,j}$ and the expected reference signal transmitted by second UE 350b. First base station 375a then has two equations relating $x_{i,j}^u$ and $x_{i,j}^d$ and thus it can obtain detected values for $\hat{x}_{i,j}^u$ and $\hat{x}_{i,j}^d$ using Equations 3 and 5, above. In this manner, first base station 375a may resolve the desired uplink transmission.

The foregoing systems and methods and associated devices and modules are susceptible to many variations. Additionally, for clarity and concision, many descriptions of the systems and methods have been simplified. For example, the figures generally illustrate one of each type of device (e.g., one access node, one terminal node), but a communication system may have many of each type of device. Similarly, descriptions may use terminology and structures of a specific wireless standard such as LTE. However, the disclosed systems and methods are more broadly applicable, including for example, in hybrid fiber-coax cable modem systems.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the claims.

What is claimed is:

1. An access node in a wireless communication network, the access node conducting interference resolution of a received signal, the access node comprising:
   a transceiver module configured to receive and send data via the wireless communication network;
   a backhaul module configured to receive and send data via a backhaul communication link;
   a memory; and
   a processor coupled to the transceiver module, the backhaul module and the memory and configured to:
      identify at least one neighboring access node in the wireless communication network,
      exchange, via the backhaul module, communication parameters with the at least one neighboring access node,
      receive, via the transceiver module, a signal comprising a transmission from a first user equipment and an interfering transmission from a second user equipment, the signal being received over a plurality of uplink resources,
      receive, via the backhaul module, resource information from one or more of the at least one neighboring access node, the resource information corresponding to the plurality of uplink resources, and
      apply the resource information for interference resolution of the received signal, the application of the resource information for interference resolution of the received signal including determining channel transfer function components based on the resource information received from the one or more neighboring access node and on the signal received by the access node.

2. The access node of claim 1, wherein the exchange of communication parameters with the at least one neighboring access node is performed via a central entity in the wireless communication network.

3. The access node of claim 1, wherein the communication parameters include at least one of a hopping sequence indication and a reference signal indication.

4. The access node of claim 1, wherein the resource information received from the one or more neighboring access node corresponds to at least some of the plurality of uplink resources and is based on an uplink transmission as received by the one or more neighboring access node.

5. The access node of claim 4, wherein the resource information received from the one or more neighboring access node further includes an expected reference signal indication that is associated with the uplink transmission received by the one or more neighboring access node.

6. The access node of claim 1, wherein the resource information received from the one or more neighboring access node is obtained from a specified stage of receiver processing in the one or more neighboring access node.

7. The access node of claim 6, wherein the specified stage of receiver processing is a resource demapping stage.

8. The access node of claim 6, wherein the specified stage of receiver processing is a stage of receiver processing occurring after an FFT processing stage.

9. The access node of claim 1, wherein the resource information is received from the one or more neighboring access node in response to an assistance request sent from the access node to the one or more neighboring access node.

10. The access node of claim 9, wherein the assistance request is sent from the access node to the one or more neighboring access node if the access node determines that it is unable to decode the transmission from the first user equipment.

11. The access node of claim 1, wherein the determined channel transfer function components are associated with the transmission from the first user equipment and with the interfering transmission from the second user equipment.

12. A system in a wireless communication network for conducting interference resolution of a received signal, the system comprising:
an access node; and
a neighboring access node;
wherein the access node comprises a transceiver module, a backhaul module, a memory and a processor configured to:
identify a neighboring access node in the wireless communication network,
exchange, via the backhaul module, communication parameters with the neighboring access node,
receive, via the transceiver module, a first signal comprising a transmission from a first user equipment and an interfering transmission from a second user equipment, the first signal being received over a plurality of uplink resources,
receive, via the backhaul module, resource information from the neighboring access node, the resource information being associated with the plurality of uplink resources, and
apply the resource information for interference resolution of the received first signal; and the application of the resource information for interference resolution of the received signal including determining channel transfer function components based on the resource information received from the one or more neighboring access node and on the signal received by the access node; and
wherein the neighboring access node comprises a transceiver module, a backhaul module, a memory and a processor configured to:
exchange, via the backhaul module, communication parameters with the access node,
receive, via the transceiver module, a second signal comprising a transmission from the second user equipment and an interfering transmission from the first user equipment,
receive, via the backhaul module, an assistance request from the access node, the assistance request including an identification of a plurality of uplink resources, and
send, via the backhaul module and in response to the assistance request, resource information to the access node, the resource information being associated with the second received signal in the identified plurality of uplink resources.

13. A method for interference resolution of a received signal by an access node in a wireless communication network, the method comprising the steps of:
identifying at least one neighboring access node in the wireless communication network;
exchanging, via a backhaul module, communication parameters with the at least one neighboring access node;
receiving, via a transceiver module, a signal comprising a transmission from a first user equipment and an interfering transmission from a second user equipment, the signal being received over a plurality of uplink resources;
receiving, via the backhaul module, resource information from one or more of the at least one neighboring access node, the resource information corresponding to the plurality of uplink resources; and
applying the resource information for interference resolution of the received signal, applying the resource information for interference resolution of the received signal including determining channel transfer function components based on the resource information received from the one or more neighboring access node and on the signal received by the access node.

14. The method of claim 13, wherein the step of exchanging communication parameters with the at least one neighboring access node is performed via a central entity in the wireless communication network.

15. The method of claim 13, wherein the communication parameters include at least one of a hopping sequence indication and a reference signal indication.

16. The method of claim 13, wherein the resource information received from the one or more neighboring access node corresponds to at least some of the plurality of uplink resources and is based on an uplink transmission as received by the one or more neighboring access node.

17. The method of claim 16, wherein the resource information received from the one or more neighboring access node further includes an expected reference signal indication that is associated with the uplink transmission received by the one or more neighboring access node.

18. The method of claim 13, wherein the resource information received from the one or more neighboring access node is obtained from a specified stage of receiver processing in the one or more neighboring access node.

19. The method of claim 18, wherein the specified stage of receiver processing is a resource demapping stage.

20. The method of claim 18, wherein the specified stage of receiver processing is a stage of receiver processing occurring after an FFT processing stage.

21. The method of claim 13, wherein the method further includes the step of sending an assistance request from the access node to the one or more neighboring access node, and wherein the resource information is received from the one or more neighboring access node in response to the assistance request.

22. The method of claim 21, wherein the assistance request is sent from the access node to the one or more neighboring access node if the access node determines that it is unable to decode the transmission from the first user equipment.

23. The method of claim 13, wherein the determined channel transfer function components are associated with the transmission from the first user equipment and with the interfering transmission from the second user equipment.

* * * * *